United States Patent
Sano et al.

[11] Patent Number: 5,972,483
[45] Date of Patent: Oct. 26, 1999

[54] SURFACE-DECORATED UTENSIL WITH NOBLE METAL USABLE IN ELECTRIC RANGE

[75] Inventors: Masato Sano; Nobuhiro Inoko; Kazutaka Nakayama, all of Nagoya; Hideyuki Sekine, Aichi-ken, all of Japan

[73] Assignee: Noritake Co., Ltd., Aichi-ken, Japan

[21] Appl. No.: 08/771,782

[22] Filed: Dec. 20, 1996

[30] Foreign Application Priority Data

Dec. 27, 1995 [JP] Japan .................................. 7-353053

[51] Int. Cl.⁶ .................................................... B32B 17/00
[52] U.S. Cl. ......................... 428/209; 428/210; 428/434; 428/701; 428/702
[58] Field of Search .................. 428/434, 209, 428/210, 469, 471, 472, 701, 702; 427/374.6, 376.1, 376.2, 376.7, 383.5

[56] References Cited

U.S. PATENT DOCUMENTS

| | | | |
|---|---|---|---|
| 4,713,512 | 12/1987 | Wild | 219/10.55 E |
| 4,748,071 | 5/1988 | Wild | 428/210 |
| 5,155,319 | 10/1992 | Chiu | 219/10.491 |
| 5,783,310 | 7/1998 | Sano | 428/434 |

FOREIGN PATENT DOCUMENTS

| | | |
|---|---|---|
| A-55-51776 | 4/1980 | Japan . |
| A-55-56079 | 4/1980 | Japan . |
| B-2-36558 | 8/1990 | Japan . |
| B-3-3481 | 1/1991 | Japan . |
| B-5-13113 | 2/1993 | Japan . |
| A-6-48779 | 2/1994 | Japan . |
| B-7-5411 | 1/1995 | Japan . |

*Primary Examiner*—Timothy Speer
*Attorney, Agent, or Firm*—Morrison & Foerster LLP

[57] ABSTRACT

Surface-decorated utensil includes a ceramic ware and a plurality of decorative laminar elements of noble metal on its surface. As an alternative, the spacing between neighboring laminar elements is not less than 0.2 mm and the maximum length of each laminar element is not more than 8.5 mm. As another alternative, the spacing between neighboring laminar elements is not less than 10 mm and the maximum length of each laminar element is not more than 12 mm. In addition, the laminar elements are coated with a frit layer. The surface-decorated utensil is not damaged when used in an electronic range, while it is superior in chemical durability and coloration.

23 Claims, 1 Drawing Sheet

SURFACE-DECORATED UTENSIL WITH NOBLE METAL USABLE IN ELECTRIC RANGE

FIELD OF THE INVENTION

This invention relates to a surface-decorated utensil having a surface decorative member by noble metal insusceptible to damage on exposure to a high-frequancy electro-magnetic wave emanated from an electric range.

BACKGROUND

In a ceramic utensil, such as pottery, china ware or porcelain, glassware or enamelware, gold or silver colored beautiful decoration is sometimes applied to its surface for imparting graceful or gorgeous impression. The conventional surface-decorated utensil is produced by coating a liquid gold (metal) containing an organic compound of noble metals, typified by gold resin balsam sulfide, on the surface of the utensil, by brushing or spraying or using a transfer paper etc., and subsequently firing the coated utensil. However, if the surface-decorated utensil, thus produced, is heated in, for example, an electronic range, sparks are generated on the surface of the decorative members of noble metal by the high-frequency electro-magnetic waves emanated by the electronic range thus producing cracks in the decorative members or peeling off of the decorative members. This is ascribable to the fact that the noble metal compounds making up the decorative members of noble metal is electrically conductive. For this reason, researches are recently under progress into the electrically non-conductive noble metal decorations insusceptible to damages when used in an electronic range.

For example, in JP Patents Kokal JP-A-55-51776 and JP-A-55-56079, a frit not containing or containing only a small amount of lead is added in a gold-colored or golden ingredient(s). it is stated in these Kokai publications that particles of noble metal are enclosed in the frit mixed therein and vitrified by melting of the frit caused by firing thus assuring excellent wear resistance and resistance against chemicals as well as excellent withstand voltage characteristics.

In JP Patents Kokoku JP-B-2-36558 and JP-B-5-13113 are disclosed liquid-gold or paste-gold for overglaze decoration comprised of a mixture of organic compounds of bismuth, indium and silicon. It is stated in these Patents that the noble metal decoration formed of the noble metal for overglaze decoration, that is a gold alloy, becomes electrically non-conductive by the presence of the above ingredients.

In JP Patent Kokai JP-A-6-48779, barium is added in addition to the ingredients that make the gold alloy electrically non-conductive for improving coloration in gold or silver color.

The conventional ceramic utensils, such as pottery, china ware or porcelain, glassware or enamelware, on which are applied gold or silver colored decorative members of noble metal usable on an electronic range, are made electrically insulating by adding insulating organic components in the form of organic compounds or frit into the noble metal for overglaze decoration, so that the utensil is not subjected to sparking when used in an electronic range.

In JP Patent Kokoku JP-B-3-3481 (or USA-4,713,512), there is described a tableware having a decorative member by net elements having spacings between the elements of at least 0.2 mm and a maximum size of 5 mm for withstanding microwaves.

SUMMARY OF THE DISCLOSURE

However, certain problems have been encountered during the investigations toward the present invention. Namely, in JP Patent Kokai JP-A-55-51776, JP Patent Kokai JP-A-55-56079, JP Patent Kocoku JP-B-2-36558, JP Patent Kokoku JP-B-5-13113 and in JP Patent Kokai JP-A-6-48779, the decorative member of noble metal in the surface-decorated utensil is of a single noble metal film layer structure, such that, if it is ground with a sand paper (or emery cloth), it becomes electrically conductive and, it fed into the inside of an electronic range, it is destroyed by thermal shock. If the utensil is immersed in a boiling alkaline solution, the insulating components in the noble metal film in dissolved in alkali and the electrical insulating properties are destroyed. If the utensil is then used in the electronic range, it is subjected to sparking. That is, if the utensil is repeatedly washed with a washing brush, an abrasive or with a strongly alkaline detergent in an automatic tableware washer, the insulating properties of the noble metal film are destroyed, such that, if the utensil is then used in the electronic range, it is subjected to sparking, or the decorative members are destroyed. If silicon is added into noble metal for securing electrical non-conductivity, coloration in gold or silver color is slightly deteriorated.

In the decorative members by the not elements as disclosed in JP Patent Kokoku JP-B-3-3481, if moisture is attached to the net elements to cause shorting, or the net elements are scratched, the utensil is subjected to sparking when used in the electronic range.

It is therefore an object of the present invention to provide a surface-decorated utensil which is not subjected to sparking or destruction of the decoration when used in the electronic range and is chemically or mechanically resistant, and which is decorated with noble metal exhibiting superior coloration in gold or silver colors. It is another object of the present invention to provide a method for producing such surface decorated utensil.

The objects of the present invention are not limited to the above objects and further objects will become apparent from the entire disclosure including claims. It is expressly mentioned that further aspects which are not subject matter as originally presented in the claims will not be abandoned, and the right for further claiming and/or filing a divisional or continuation application will be hereby reserved.

The present invention provides a surface-decorated utensil which is chemically and mechanically stable and which is superior in use withstand properties in an electronic range and in coloration of noble metals by defining the spacing between neighboring one of a plurality of laminar elements representing the decorative members of noble metal for the surface of the ceramic utensil, and by defining the maximum length of the laminar elements. That is, by defining the spacing between the laminar elements and so forth, and by coating each laminar element with a frit layer, the utensil is not subjected to sparking, while there is no risk of destruction of the decorative members. Since each laminar element is coated with the frit layer, the utensil is chemically and mechanically stable. Moreover, by defining the spacing between the laminar elements and so forth, and by coating each laminar element with a frit layer, ordinary electrically conductive liquid gold for overglaze decoration may be used for decoration, while there is no necessity of using silicon or the like in order to render the laminar elements electrically non-conductive, so that coloration in gold or silver color becomes outstanding. That is, the subject-matter of aspect 1 resides in a surface-decorated utensil comprising a ceramic ware and a plurality of decorative laminar elements of noble metal on the surface thereof, wherein (a) the spacing between neighboring laminar elements is not less than 0.2 mm and the maximum length of each laminar element is not more than 8.5 mm, or (b) the spacing between neighboring laminar elements is not less than 10 mm and the maximum length of each laminar element is not more than 12 mm, and wherein the laminar elements are coated with a frit layer.

According to another method aspect of the present invention also provides a method for producing the above-described surface-decorated utensil. That is, the present invention provides a method for producing a surface-decorated utensil comprising a ceramic ware and a plurality of decorative laminar elements of noble metal on the surface thereof, wherein (a) the spacing between neighboring laminar elements is not less than 0.2 mm and the maximum length of each laminar element is not more than 8.5 mm, or (b) the spacing between neighboring laminar elements is not less than 10 mm and the maximum length of each laminar element is not more than 12 mm, and wherein the laminar elements are coated with a frit layer. The method includes applying the laminar elements (material) on the surface of the ceramic utensil using noble metal for overglaze decoration in a defined pattern under the condition that the dimension (a) or (b) after firing is achieved, firing the resulting assembly, coating the (fired) laminar elements with a frit layer and firing the resulting product. Alternatively, the surface-decorated utensil may also be produced by a method comprising : applying the laminar elements (material) on the surface of the ceramic ware using noble metal for overglaze decoration, coating the laminar elements (material) with a frit layer and firing the resulting product.

Further aspects of dependent claims are directed to preferred embodiments. That is, in the surface-decorated utensil or in the method for producing the same, it is desirable that the noble metal be a mixture of gold and a metal reflected from the group consisting of platinum, palladium and silver or gold, or the noble metal contains gold.

The laminar element preferably has a thickness of 0.1 to 50 $\mu$m.

The frit layer preferably has a layer thickness of 0.1 to 50 $\mu$m. By using this layer thickness, the noble metal is improved in coloration and may be rendered resistant for use in an electronic range.

The frit layer preferably has a composition of 0 to 9 wt % of $Na_2O$, 0 to 10.5 wt % of $K_2O$, 0 to 10.5 wt % of $Li_2O$, 0 to 9 wt % of CaO, 0 to 3 wt % of MgO, 8 to 20 wt % of $B_2O_3$, 53 to 62 wt % (preferably 54 to 62 wt %) of $SiO_2$, 0 to 2 wt % of $ZrO_2$, 0 to 3 wt % of $P_2O_5$, and 10 to 18 wt % of $Al_2O_3$ wherein, preferably, the sum of the amounts of three ingredients $Na_2O$, $k_2O$ and CaO is not less than 6 wt % and the sum of the amounts of the entire ingredients is 100 wt %. By using this composition, it becomes possible to maintain usability in an electrical range with the coloration of noble metal being substantially unimpaired.

Further, the frit layer preferably has a composition of 0 to 9 wt % of $Na_2O$, 0 to 10.5 wt % of $Li_2O$, 0 to 9 wt % of CaO, 0 to 4 wt % of MgO, 8 to 20 wt % of $B_2O_5$, 52 to 62 wt.% of $SiO_2$, 0 to 4 wt % of $ZrO_2$, 0 to 3 wt % of $P_2O_5$, and 8 to 18 wt % of $Al_2O_3$, 0 to 7 wt % of BaO and 0 to 4.5 wt % of SrO wherein, preferably, the sum of the amounts of three ingredients $Na_2O$, $k_2O$ and CaO is not less than 6 wt % and the sum of the amounts of the entire ingredients is 100 wt %. By using this composition, it becomes possible to maintain usability in an electrical range, while the coloration of noble metal is improved (coloration range is broadened) by the presence of BaO and/or SrO.

The above frit layer preferably further contains not more than 20 parts by weight of PbO to 100 parts by weight of the frit composition as mentioned above. By using this composition, it becomes possible to obtain noble metal color excellent in luster, light transmission and color tone.

The frit layer preferably has a withstand voltage of not less than 80 V. By the frit layer having the withstand voltage of not less than 80 V, the utensil has usability in an electronic range. In the present invention, the numerical range includes not only both extreme values but also all intermediate values.

EXPLANATION OF NUMERALS 1, 2, 3. . . laminar elements; A, B, . . . sharp points of laminar element.

EMBODIMENTS

According to the present invention, the above-mentioned problems are all resolved by defining the spacings between the laminar elements, as decorative members by noble metal, and the maximum length of the individual laminar elements, and by covering the laminar elements with the frit layer, for thereby preventing sparking caused by high-frequency electro-magnetic waves generated by the electronic range for providing a surface-decorated utensil having chemical durability, wear resistance and superior coloration in gold and silver colors.

Although there is no limitation to the ceramic article employed in the present invention, provided that it has durability against high-frequency electro-magnetic waves by the electronic range, preferred ceramic articles may be enumerated by, for example, pottery (or ceramic whiteware) and porcelain articles, such as earthenware, porcelain, chinaware or stoneware, refractory articles, such as bricks, glass, enamel, and generally ceramics (cumulatively referred to as "ceramic ware").

If, for decorating the surface of a ceramic article, the decorative member itself is to be electrically nonconductive for affording usability in an electronic range, silicon, indium or calcium need to be added to the noble metal. However, there is raised a problem that the coloration in gold or silver color becomes slightly poor due to addition of silicon and so forth. By setting certain limitations or rules on, for example, the spacings of the laminar elements making up the decorative members, according to the percent invention, it becomes possible to prevent sparking or the like from occurring in the electronic range even if usual electrically conductive liquid gold for overglaze decoration is used for affording decoration by noble metal. These rules are now explained.

Figure 1:
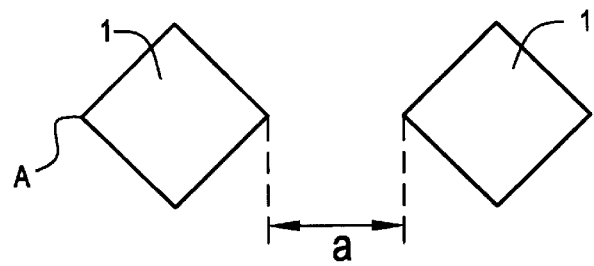
FIG. 1 is a schematic view showing an example of a laminar element.

First, the spacing between neighboring laminar elements needs to be not less than 0.2 mm. If the spacing is less than 0.2 mm, sparking is induced when the surface-decorated utensil is used in an electronic range. The spacing means the distance between neighboring laminar elements. For example, the spacing in FIG. 1, between two squares 1, as neighboring laminar elements, is a.

Figure 2:
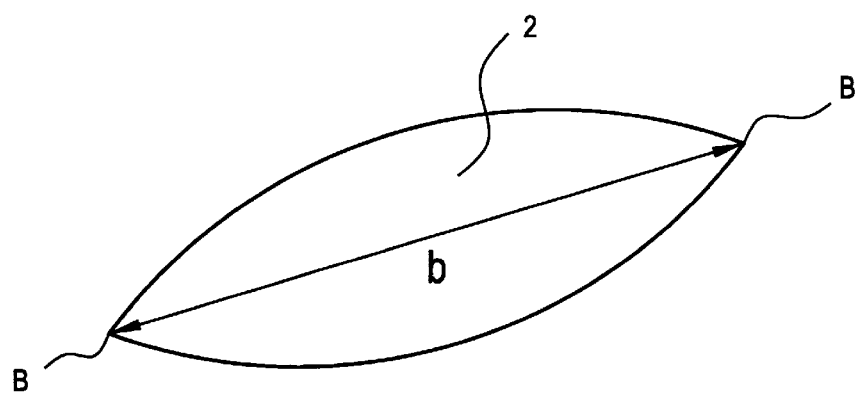
FIG. 2 is a schematic view showing another example of a laminar element.
Figure 3:
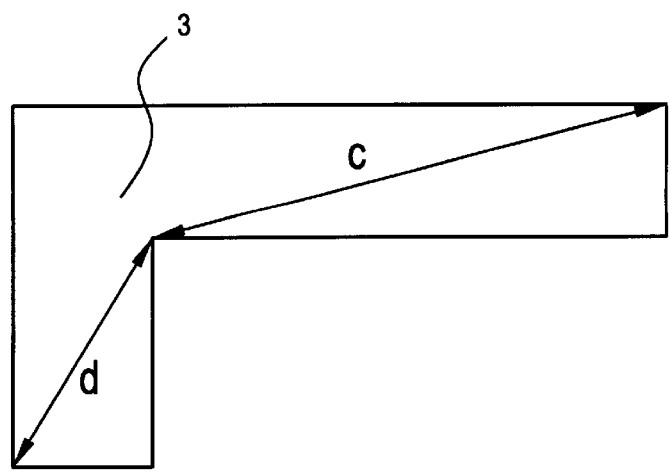
FIG. 3 is a schematic view showing still another example of a laminar element.

Next, the maximum length of each laminar element is not more than 8.5 mm. If the maximum length is larger than 8.5 mm, sparking is produced when the surface-decorated utensil is used in an electronic range. The maximum length herein means the largest one of lengths interconnecting two arbitrary points of a given laminar element. For example, the maximum length of a leaf-like laminar element shown in FIG. 2 is b. In an L-shaped element 3, shown in FIG. 3, the maximum length is c+d.

There is no particular limitation to the shape of the laminar element. For example, the shape of the laminar element may be of circle, ellipse, square, rectangle, lozenge, frustum, parallelepiped, regular triangle, regular pentagon, regular hexagon, rope, leaf, star or asterisk, and amoeber-like shape. It should be noted that the effect of the above rules is outstanding in case the laminar element has a shape devoid of sharp points, e.g., point A of the square 1 in FIG. 1, point B of the laminar element 2 in FIG. 2 or an end point of a needle-like laminar element (an acute corner less than 90°, as when the laminar element is circular or an elliptical in shape). That is, by providing the above rule, the risk of sparking and the resultant destruction of the decoration may be significantly decreased if all edge parts of the laminar element are of rounded shape, even if the surface-decorated utensil having such laminar elements are used in an electronic range.

The effect of providing the above rules on the spacing between the laminar elements and the maximum length is similarly significant in case the laminar element has sharp points, such as a square or a star or asterisk. However, it is more desirable to set the maximum length of each laminar element to not more than 6 mm. The reason is that, if a surface-decorated utensil having such laminar element is used in an electronic range, the probability is rather high that sparking or the like be produced at these sharp points. The maximum length of each laminar utensil of less than 0.3 mm is not necessarily desirable since the decorative value is decreased and, in addition, the decoration becomes technically difficult.

If the spacing between neighboring laminar elements is not less than 10 mm, the maximum length of each laminar element is not more than 12 mm. Although the maximum length of the laminar element is longer than the above length of 8.5 mm, there is little risk of sparking if the surface-decorated article having such laminar element is used in an electronic range, because the spacing between the laminar elements is as long as 10 mm or more.

As for the spacing between the neighboring laminar elements, all of such spacings need not necessarily be equal. In addition, all of the maximum lengths of the laminar elements need not necessarily be equal. Moreover, the laminar elements need not be of the same shape.

The laminar element may also be made up of plural layers. For example, a silvery-colored (or silvery) plate shaped element may be first applied on the surface of a ceramic ware and gold-colored (golden) laminar elements of the same shape and the same maximum length may then be applied on the laminar elements to provide a dual-layer structure.

According to the present invention, since the laminar element is coated with a frit layer, the ingredients necessary for rendering the laminar elements electrically non-conductive, that is silicon, indium or calcium, need not necessarily be contained when applying decoration by noble metal. That is, usual electrically conductive liquid gold for overglaze decoration, exhibiting coloration in gold or silver color, may be used for decoration, thus preventing insufficient coloration of noble metal color ascribable to the use of silicon, indium or calcium.

According to the present invention, the laminar element can be colored in noble metal color, such as silver or gold color, by containing a mixture of gold and at least one metal selected from the group consisting of platinum, palladium and silver, or by containing gold. Gold is used for gold coloration, while platinum, palladium or silver is used in combination with gold for silver coloration. That is, for forming a laminar element of a silver color of a particularly bright color tone, the metal composition of the laminar element preferably is of a composition comprised of gold admixed with a pre-set amount of silvery metals selected from the group consisting of platinum, palladium and silver. The amount of addition is preferably 0.5 to 5.0 parts by weight to 100 parts by weight of gold. If the amount of addition is in this range, the laminar element may be colored excellently in silver color.

In addition, bismuth, rhodium, chromium or vanadium etc. may be contained in the laminar element. If rhodium is added to gold, the laminar element may be increased in strength at 750° C. or higher. If bismuth is added, a laminar element colored in bright gold tone may be produced. In addition, adhesion strength to the underlying material, such as pottery or enamel, may be improved. If chromium is added, instability of the fired film or insufficient coloration may be prevented in case alkali is contained as impurity. If vanadium is added further, bonding strength of, for example, gold, may be increased in case the underlying material is a plate glass, for example, to which the laminar elements need to be bonded by baking at a lower temperature. Preferably, rhodium and bismutih are added in amounts of 0.1 to 2 parts by weight and 1 to 10 parts by weight to 100 parts by weight of gold, respectively. On the other hand, chromium and vanadium are preferably added in amounts of 0.1 to 2 parts by weight to 100 parts by weight of gold, repectively. As for the laminar element of a silver color tone, rhodium, bismuth, chromium and vanadium are preferably added for the same objective as that for the golden laminar element. Preferably, rhodium and bismuth are added in amounts of 0.1 to 2 parts by weight and 1 to 10 parts by weight to 100 parts by weight of gold, respectively. On the other hand, chromium and vanadium are preferably added in amounts of 0.1 to 2 parts by weight to 100 parts by weight of gold, respectively.

Although the coloration in noble metal color becomes slightly inferior, calcium, indium or silicon, for example, may be contained for rendering the laminar element electrically non-conductlve (electrically insulating). By making the laminar element electrically non-conductive, it is improved in durability against high-frequency electromagnetic waves. For forming a decorative member of noble metal having a brighter gold color tone, the metal composition of the golden components making up the laminar element is preferably adjusted so that gold, silicon, indium and calcium accounts for 60 to 90 wt %, 3 to 15 wt %, 2 to 11 wt % and 2 to 14 wt %, respectively with a total amount of the ingredients being 100 wt %.

The laminar element is preferably of an arbitrary thickness between 0.1 to 50 $\mu$m, more preferably 0.1 to 10 $\mu$m. If the thickness of the laminar element is set to 0.1 to 50 $\mu$m, not only coloration in gold or silver color is stabilized, but also the requirement for economicity is met.

Although the spacing and the maximum length of the laminar elements are defined as above, these definitions alone are not sufficient to prevent sparking in the electronic range completely. For example, if the moisture becomes attached to the laminar element to cause its shorting or damages such as pin-holes, sparking can hardly be prevented from occurring. It is therefore necessary to coat the laminar element with a frit layer having resistance against chemicals, such as boiling alkaline solutions, or mechanical abrasion, for thereby protecting the laminar elements. In this regard, the frit layer must be a dense and uniform layer. Moreover, it is required of the frit layer to keep the color tone of the laminar elements intact, so that its important requirement is transparency.

It is also required of the frit layer to be fired at a temperature not higher than the fusing/softening temperature of the base material or the glaze of a ceramic ware as a member to be decorated. It is therefore preferred to adjust the frit solution (or paste) so that its softening temperature will be, approximately, 450 to 600° C.; 700 to 900° C. and 750 to 850° C. for glass; pottery, china ware or porcelain; and enamelware, respectively.

Moreover, for preventing defects such as microcrack formation in the frit layer, the composition of the frit layer should be selected so that its thermal expansion coefficient is close to that of the decorated article. Pertinent to the attainment of the above objective are the modulus of elasticity and tensile strength of the frit layer in addition to the thermal expansion coefficient referred to above. That is, the modulus of elasticity is an important factor for preventing the microcrack formation in the frit layer, while the tensile strength is an important factor in preventing fatigue fracture caused by micro-sized cracks present on its surface.

As will be clear from above, the frit layer according to the present invention is mainly composed of $SiO_2$, $B_2O_3$ and $Al_2O_3$, as glass-forming oxides, suitably admixed with alkali metal compounds or alkaline earth metal compounds. Addition of 20 parts by weight or less of PbO to 100 parts by weight of the above composition leads to significantly improved luster and transparency and to excellent noble metal color tone.

As for the frit layer, the following composition is preferred in view of preventing sparking, keeping the coloration of noble metal color unimpaired and maintaining chemical and mechanical durability. That is, the composition of the frit layer is 0 to 9 wt % of $Na_2O$, 0 to 10.5 of $K_2O$, 0 to 10.5 wt % of $Li_2O$, 0 to 9 wt % of CaO, 0 to 3 wt % of MgO, 10 to 18 wt % of $Al_2O_3$, 8 to 20 wt % of $B_2O_3$, 54 to 62 wt % of $SiO_2$, 0 to 2 wt % of $ZrO_2$ and 0 to 3 wt % of $P_2O_5$, wherein the sum of the amounts of the three ingredients $Na_2O$, $k_2O$ and CaO is not less than 6 wt % and the sum of the amounts of the entire ingredients is 100 wt %. 0 to 20 wt % of PbO may also be added to the above composition. The same frit composition may be used as those disclosed in the earlier application of the same applicant baged on Japanese Patent application No. 6-329122 filed on Dec. 27, 1994 and corresponding U.S. patent application Ser. No 08/578,117 filed on Dec. 27, 1995, the disclosure of which is incorporated herein by reference.

As for $Li_2O$, MgO, $ZrO_2$ and $P_2O_5$, coloration of noble metal can be adjusted from lustrous state to matted state, depending on the objective, by increasing or decreasing these ingredients within the above range. For example if the contents of the above ingredients are small, the coloration is in lustrous color, whereas, if the contents are large, the coloration is in matted color. If the above range is exceeded, the color tone inherent to noble metal is impaired.

As for $Na_2O$, $K_2O$ and CaO, if the sum of these three ingredients is less than 6 wt %, the frit becomes less fusible, such that coloration becomes inferior. If the above range is exceeded, the utensil becomes weak against thermal shock within the electronic range, thus producing cracks, even though the glass appears to be transparent and coloration becomes better.

As for $Al_2O_3$ and $SiO_2$, if the amounts of these ingredients become less than the above range, chemical durability is lowered, whereas, if the amounts become larger than the above range, coloration becomes inferior. As for $B_2O_3$, if the amount is less than the above range, fusibility becomes poor, whereas, if the amount exceeds the above range, chemical durability tends to be lowered. On the other hand, if PbO is added in an amount exceeding the above range, coloration becomes inferior.

The frit layer having tho desired properties can be obtained by adjusting the composition within the above range. Examples are shown in Table 1.

TABLE 1

Properties Required of Frit Layer

Components (wt %)

| Examples | | For Golden Decoration | | | | | | For Silvery Decoration | |
|---|---|---|---|---|---|---|---|---|---|
| | | 1 | 2 | 3 | 4 | 5 | 6 | 7 | 8 |
| Golden Components (parts by weight) | | 100 parts | 100 parts | 100 parts | 100 parts | 100 parts | 100 parts | 100 parts | 100 parts |
| Components | Au | 96 | 96 | 96 | 96 | 96 | 96 | 96 | 96 |
| | Bi | 3.0 | 3.0 | 3.0 | 2.2 | 3.0 | 3.0 | 2.2 | 3.0 |
| | Rh | 0.6 | 0.6 | 0.6 | 0.6 | 0.6 | 0.6 | 0.6 | 0.6 |
| | Cr | 0.4 | 0.4 | 0.4 | 0.4 | 0.4 | 0.4 | 0.4 | 0.4 |
| | V | — | — | — | 0.8 | — | — | 0.8 | — |
| Silvery Components (parts by weight) | | — | — | — | — | — | — | 2.5 parts | 2.5 parts |
| Components | Pt | — | — | — | — | — | — | 1.25 | 1.25 |
| | Pd | — | — | — | — | — | — | 1.25 | 1.25 |
| Shape of Laminar Elements | | Square Shaped | Square Shaped | Square Shaped | Square Shaped | Square Shaped | Square Shaped | Square Shaped | Square Shaped |
| Size of Laminar Elements (Diagonal Line) | | 4 mm | 4 mm | 4 mm | 4 mm | 4 mm | 4 mm | 4 mm | 4 mm |
| Distance between Neighboring Laminar Elements | | 0.3 mm | 0.3 mm | 0.3 mm | 0.3 mm | 0.3 mm | 0.3 mm | 0.3 mm | 0.3 mm |
| Frit Component (parts by weight) | | 100 parts | 100 parts | 100 parts | 100 parts | 100 parts | 100 parts | 100 parts | 100 parts |

TABLE 1-continued

Properties Required of Frit Layer

| | | Components (wt %) | | | | | | | |
|---|---|---|---|---|---|---|---|---|---|
| | | For Golden Decoration | | | | | | For Silvery Decoration | |
| Examples | | 1 | 2 | 3 | 4 | 5 | 6 | 7 | 8 |
| Components | $Na_2O$ | 3 | 4.5 | 6 | 6 | 3 | 4.5 | 6 | 3 |
| | $K_2O$ | 4 | 6 | 8 | 8 | 4 | 6 | 8 | 4 |
| | CaO | 3 | 4.5 | 7 | 7 | 3 | 4.5 | 7 | 3 |
| | $Al_2O_3$ | 16 | 14 | 12 | 12 | 14 | 13.5 | 12 | 14 |
| | $B_2O_3$ | 14 | 12 | 10 | 10 | 13 | 11 | 10 | 13 |
| | $SiO_2$ | 60 | 59 | 57 | 57 | 57 | 57 | 57 | 57 |
| | $Li_2O$ | — | — | — | — | 0.5 | 0.5 | — | 0.5 |
| | MgO | — | — | — | — | 3 | 1.5 | — | 3 |
| | $ZrO_2$ | — | — | — | — | 2 | 1 | — | 2 |
| | $P_2O_5$ | — | — | — | — | 0.5 | 0.5 | — | 0.5 |
| | PbO | — | — | — | 20 | — | — | 20 | — |
| Yield Point of Frit (° C.) | | 703 | 698 | 697 | 555 | 705 | 701 | 555 | 705 |
| Thermal Expansion Coefficient of Frit α (× $10^{-6}$) | | 5.3 | 6.4 | 7.3 | 7.4 | 5.4 | 6.5 | 7.4 | 5.5 |
| Sintering Temperature of Noble Metal Film Layer (° C.) | | 800 | 800 | 800 | 580 | 800 | 800 | 580 | 800 |
| Sintering Temperature of Frit Layer (° C.) | | 850 | 800 | 800 | 600 | 850 | 800 | 600 | 850 |
| Object (Base) for Decoration | | Hard Glaze | Soft Glaze | Soft Glaze | Soda Glaze | Hard Glaze | Soft Glaze | Soda Glaze | Hard Glaze |

TABLE 1-B

Properties Required of Frit Layer

| | | Components (wt %) | | | | | | | |
|---|---|---|---|---|---|---|---|---|---|
| | | For Golden Decoration | | | | | | For Silvery Decoration | |
| Examples | | 1 | 2 | 3 | 4 | 5 | 6 | 7 | 8 |
| Components | $Na_2O$ | 3 | 4.5 | 6 | 6 | 3 | 4.5 | 6 | 3 |
| | $K_2O$ | 4 | 6 | 8 | 8 | 4 | 6 | 8 | 4 |
| | CaO | 3 | 4.5 | 7 | 7 | 3 | 4.5 | 7 | 3 |
| | $Al_2O_3$ | 16 | 14 | 12 | 12 | 14 | 13.5 | 12 | 14 |
| | $B_2O_3$ | 14 | 12 | 10 | 10 | 13 | 11 | 10 | 13 |
| | $SiO_2$ | 60 | 59 | 57 | 57 | 57 | 57 | 57 | 57 |
| | $Li_2O$ | — | — | — | — | 0.5 | 0.5 | — | 0.5 |
| | MgO | — | — | — | — | 3 | 1.5 | — | 3 |
| | $ZrO_2$ | — | — | — | — | 2 | 1 | — | 2 |
| | $P_2O_5$ | — | — | — | — | 0.5 | 0.5 | — | 0.5 |
| | PbO | — | — | — | 20 | — | — | 20 | — |
| Yield Point of Frit (° C.) | | 703 | 698 | 697 | 555 | 705 | 701 | 555 | 705 |
| Thermal Expansion Coefficient of Frit α (×$10^{-1}$) | | 5.3 | 6.4 | 7.3 | 7.4 | 5.4 | 6.5 | 7.4 | 5.5 |
| Sintering Temperature of Noble Metal Film Layer (° C.) | | 800 | 800 | 800 | 580 | 800 | 800 | 580 | 800 |
| Sintering Temperature of Frit Layer (° C.) | | 850 | 800 | 800 | 600 | 850 | 800 | 600 | 850 |
| Object (Base) for Decoration | | Hard Glaze | Soft Glaze | Soft Glaze | Soda Glass | Hard Glaze | Soft Glaze | Doda Glass | Hard Glaze |

Fox example, PbO, as a low-temperature flux, has a function of lowering the yield point of the frit. Therefore, a frit containing this ingredient can be fired at a lower temperature, so that it is suited to decoration of ceramic wares formed of, for example, soda glass, that cannot be fired at elevated temperatures.

For preventing occurrence of defects, such as microcrack formation, it is important to adjust the composition so that the thermal expansion coefficient will become closer to that of the decorated member. In general, the ingredient possibly lowering the thermal expansion coefficient are MgO, $B_2O_3$ and so forth. If the content of alkali metal oxides is increased, the thermal expansion coefficient becomes higher. However, if a certain amount of potassium and/or lithium is substituted for sodium, the thermal expansion coefficient is lowered. Similarly, desired values of the modulus of elasticity and the tensile strength can be obtained by adjusting the composition within the above range.

The frit layer needs to completely cover the laminar elements. If, as result of generation of pinholes in the frit layer, part or all of the laminar elements is exposed to outside, sparking tends to be produced when the utensil is used in an electronic range. In order to prevent this from occurring, the frit layer preferably has a certain layer thickness. However, in case of an excessive layer thickness, the color tone of the noble metal of the laminar elements is impaired. Therefore, the layer thickness of the frit layer is preferably 0.1 to 50 $\mu$m, more preferably 3 to 33 $\mu$m and most preferably 5 to 20 $\mu$m.

Meanwhile, if pinholes or the like defects are produced in the laminar elements, the frit layer covering the laminar elements preferably has the layer thickness of 0.1 to 50 $\mu$m, as explained previously, so that sparking or the like can hardly be prevented from occurring if the surface-decorated article having such defect is used in an electronic range. It is therefore desirable that the laminar elements be free of defects, such as pinholes.

The frit layer may be formed of plural layers. For example, it is possible to apply a frit liquid of a pre-set composition on the laminar element, fire the resulting assembly, then apply a frit liquid of another pre-set composition and fire the resulting assembly to provide a two-layered frit.

The frit layer has a withstand voltage (break down voltage) preferably of not lower than 80 V and more preferably of not lower than 100 V. With the withstand voltage of not lower than 80 V, the frit layer is not susceptible to break down of insulation, such that its durability against the high-frequency electromagnetic waves is improved. Basically, the withstand voltage of the frit layer can be improved by the composition or the layer thickness of the frit layer. The withstand voltage can be measured, for example, by setting a frit layer 7 $\mu$m thick on two electrode plates and by applying an ac voltage across the two electrodes. The electrode plates should be set at 0.2 $\mu$m thick and spaced apart from each other by 250 $\mu$m, with a length of a diagonal line being 6 mm.

The method for producing the surface-decorated article according to the present invention will be now explained.

As for a paste for overglaze decoration or liquid gold, used as starting materials for the laminar elements, pre-set amounts of gold resin balsam sulfide, silver resin balsam sulfide, platinum resin acid salt, palladium resin acid salt, bismuth resin acid salt, rhodium resin acid salt, chromium resin acid salt or palladium resin acid salt, for example, are dissolved as conventionally in, for example, terebene oil. Such paste for overglaze decoration or liquid gold usually presents a blackish color. Alternatively, commercial noble metal agents may also be used. In particular, gold-containing agents, platinum-containing agents, palladium-containing agents, such as brightening gold agents, glazing gold agents, powdered gold agents, brightening platinum agents, glazing platinum agents, powdered platinum agents, or brightening palladium agents, are effective.

The above-described paste or liquid gold is coated on the surface of a ceramic article, such as glass, pottery or enamelware using a brush, spray or a transfer paper. The resulting assembly is then fired to form a laminar element. It should be noted that firing need to be performed at a temperature not higher than the melting softening temperature of the glaze or the base material of the ceramic article as a member to be decorated. Thus, if the ceramic article is formed of soda (lime) glass, for example, such that firing needs to be performed at a lower temperature, such an organic compound or complex for respective metal ingredients such as mercaptide etc., having a decomposition end temperature lower than the melting/softening temperature of the ceramic article, needs to be used. The firing temperature is generally, approximately, 400 to 1000° C. and preferably approximately, 450 to 950° C. The thickness of the laminar element is preferably set to approximately 0.1 to 50 $\mu$m, as explained previously.

The respective ingredients are then weighed and mixed to give a composition (frit liquid) mainly composed of $SiO_2$, $B_2O_3$ and $Al_2O_3$ suitably admixed with alkali metal compounds and alkaline earth metal compounds. For improving lustre, light transmittance and color tone, not less than 20 parts by weight of PbO may he added to 100 parts by weight of the above composition. The frit liquid is coated with a brush or directly printed or transcribed in the from of paste so that the laminar elements in their entirety will be coated by the frit liquid. The resulting assembly is fused and cooled to form the frit layer. Since the starting material for the frit is strongly erosive by nature, fusion should be completed in as short time as possible. Prolonged heating should be avoided since then the alkali contents are vaporized off such that the frit becomes difficultly fusible. For the similar reason, an excessive heating temperature should be avoided. In general, the heating temperature is approximately 400 to 1000° C. and preferably approximately 450 to 950° C. The layer thickness of the frit later is preferably 0.1 to 50 $\mu$m or less, as mentioned previously.

If pinholes or the like defects have been produced in the laminar elements or in the frit layer due to firing, the liquid gold for overglaze decoration, the paste or frit liquid may be coated on the defective portion by the same coating method as explained above, and the resulting assembly may subsequently be fired, for repairing the defective portion.

Meanwhile, the liquid gold for overglaze decoration or the plate may be first coated, the frit layer may be then formed and both the laminar elements and the frit layer then may be fired simultaneously. In this case, caution should be exercised so that the organic binders for respective portions of the laminar elements be completely burned off before reaching a temperature range of forming the dense frit layer. To this end, organic compounds having a low decomposition end temperature should be selectively used, or the softening temperature of the frit should be raised.

It is preferred that the amounts of the frit ingredients making up the frit layer and the layer thickness of the frit layer be adjusted for setting the withstand voltage of the frit layer to not lower than 80 V and preferably to not lower than 100 V. With the withstand voltage of the frit layer of not lower than 80 V, there is no risk of the break down of insulation of the grit layer for assuring durability against high frequency electromagnetic waves.

EXAMPLES

Examples of the present invention will be explained which are not intended for limiting the invention. In the following description the percent (%) denotes weight percent, unless otherwise specified.

Examples 1 to 8

The paste gold for overglaze decoration, having metal compositions as shown in Table 1, were prepared.

First, noting terebene oil, a gold resin balsam sulfide solution containing 25 wt % of gold (Au), a bismuth resin acid salt solution containing 6 wt % of bismuth (Bi), a rhodium resin acid salt solution containing 5 wt % of rhodium (Rh), a chromium resin acid salt solution containing 5 wt % of chromium (Cr), a vanadium resin acid salt Solution containing 6 wt % of vanadium (V), a platinum resin acid salt solution containing 10 wt % of platinum (Pt) and a palladium resin acid salt solution containing 10 wt % of palladium (Pd), were prepared. Pasta gold for overglaze decoration, having the composition shown in each Example, was prepared from each of the above solutions. For example, in Example 1, the composition containing 38.4 parts by weight of the gold resin balsam sulfide solution, 5.0 parts by weight of the bismuth resin acid salt solution, 1.2 parts by weight of the rhodium resin acid salt solution, 0.4 part by weight of the chromium resin acid salt solution, 40 parts by weight of resin balsam, and 15 parts by weight of terebene oil was used for preparing the paste gold for overglaze decoration.

The paste gold for overglaze decoration, prepared as described above, was applied on the lateral surface of a soda (lime) glass cup, 200 ml in capacity and 10 cm in diameter, for Examples 4 and 7, and on the lateral surfaces of a coffee cup formed of ceramic (porcelain), 200 ml in capacity, for Examples 1, 2, 3, 5, 6 and 8, by the transfer paper method, in the form of generally continuously decorating patterns of square-shaped laminar elements. The square has a length of a diagonal line (maximum length) of 4 mm, with neighboring sides of the neighboring squares being parallel to each other at a spacing between the neighboring squares being 0.3 mm. The generally continuously patterned decoration of the laminar elements was fired at 580° C. and 800° C. for the soda glass cup and for the coffee cup, respectively, for providing a decorative member presenting gold or silver color. The laminar elements have a thickness of 0.2 μm.

Then, 60 parts by weight of the frit ingredients, shown in Table 1, were formed into paste, using 16 parts by weight of the acrylic resin and 24 parts by weight of SOLVESSO 150 (manufactured by ESSO STANDARD OIL), and the generally continuously patterned decoration of the laminar elements in their entirety were coated with the paste in accordance with the transfer paper method. The resulting products were maintained at 600° C. for the soda glass cup and at 850° C. for the ceramic (porcelain) cup, each for 10 minutes to form the frit layers. Each frit layer was 7 μm in thickness. The withstand voltage of the frit layer in Example 1 was 800 V.

The decorative members, obtained as described above, were tested for durability against high-frequency electromagnetic waves, using an electronic range. The test method for durability and the standard for evaluation are shown as below. Durability against High Frequency Electromagnetic Waves The glass cup or the ceramic cup, having the decorative member formed thereon, was placed at a marginal area and at the center within the electronic range at an angle of 1°, 3° and 5° relative to the bottom surface thereof. This angle was set for evading the dead angle for the microwave. The cups were irradiated with high-frequency electromagnetic waves (2450 MHz) at an output power of 500 w for one minute. This irradiation was repeated 100 times. The possible damage done to the decorative member of the glass or the ceramic was checked visually. The cups not damaged and those damaged were identified as being acceptable (OK) and as rejectable (NG), respectively. The results are shown in Table 2.

TABLE 2

| | Components (wt %) | | | | | | | |
|---|---|---|---|---|---|---|---|---|
| | For Golden Decoration | | | | | | For Silvery Decoration | |
| Examples | 1 | 2 | 3 | 4 | 5 | 6 | 7 | 8 |
| Durability against High Frequency Electro-Magnetic Waves | OK | OK | OK | OK | OK | OK | OK | OK |
| Wear Strength | 100< | 100< | 100< | 100< | 100< | 100< | 100< | 100< |
| Resistance against Chemicals | OK | OK | OK | OK | OK | OK | OK | OK |
| Acid-Proofness | 0 | 0 | 0 | 0 | 0 | 0 | 0 | 0 |
| Alkali-Proofness | 0 | 0 | 0 | 0 | 0 | 0 | 0 | 0 |
| Wear Strength after Acid-Proofness Test | 100< | 100< | 100< | 100< | 100< | 100< | 100< | 100< |
| Durability against High-Frequency Electro-Magnetic Waves after Wear Resistance Test following Alkali-Proofness Test | OK | OK | OK | OK | OK | OK | OK | OK |
| Wear Strength after Alkali-Proofness Test | 100< | 100< | 100< | 100< | 100< | 100< | 100< | 100< |
| Durability against High Frequency Electro-Magnetic Waves after Wear Resistance Test following Alkali-Proofness Test | OK | OK | OK | OK | OK | OK | OK | OK |
| Coloration | 1.7 | 1.8 | 1.7 | 1.7 | 1.8 | 1.6 | 1.6 | 1.7 |

The decorative members were not damaged on exposure to the high-frequency electro-magnetic waves radiated from the electronic range, as shown in Table 2.

[0065]

The decorative members of the Examples were then tested as to wear strength, chemical durability, acid-proofness, alkali-proofness, wear strength after the acid-proofness test, durability against high-frequency electro-magnetic waves after the wear strength test following the acid-proofness test, wear strength after the alkali-proofness test, durability against high-frequency electro-magnetic waves aster the wear strength test following the alkali-proofness test, and coloration properties. The test methods and the evaluation standards are as shown below, and test results are as shown in Table 2.

Wear Strength (Wear Resistance)

Using a rubber grinding wheel (#250, hardness grade of 75°) mounted on an wear tester, the respective decorative members were ground under the conditions of a load of 500 g and a number of revolutions of 55 rpm. The decorative members not damaged on grinding 100 or more times were evaluated to be acceptable (OK), while those damaged by grinding less than 100 times were evaluated to be rejectable (NG).

Acid-proofness, Alkali-proofness and Chemical Durability

Under the conditions shown in Table 3, the glass cup or the ceramic cup, having the decorative member formed thereon, was dipped in each chemical under the conditions shown in Table 3, and evaluation was made comprehensively based on pre-set scores for evaluation. The evaluation of the acid-proofness and alkali-proofness was made by numerical scores of "0", "0.5", "1", "2", "3" and "4", representing no damage to any decorative member, and damage of 12.5%, 25%, 50%, 75% and all of the decorative members, respectively. If all of the scores of evaluation of the respective solutions with respect to the damages are equal to or less than the judgment standards shown in Table 3, chemical durability of the decorative members was judged to be acceptable (OK). If the score of any one item exceeds the judgment standard, the decorative member was judged to be rejectable (NG).

tured by NIPPON DENSHOKU KOGYO KK). The larger the numerical values, the brighter and more satisfactory is the state of coloration. The coloration was determined by measured (L,a,b) values. As the (L,a,b) values increase, lightness, red tone and yellow tone enhance, respectively. Thus, the larger the (L,a,b) values, the more superior is the golden color. In this testing, a reference golden color was set at a value (L+a+b) of 50, and a ratio (L,a,b)/50 was defined to be the coloration value. If the coloration value is 1 or more and becomes larger, a superior golden coloration property is shown. However, a coloration value of 0.9 is sufficiently golden as well.

As shown in Table 2, the decorative members of the respective Examples were not damaged on exposure to high-frequency electro-magnetic waves of the electronic range and were superior in wear strength, acid-proofness, alkali-proofness, chemical durability, wear strength after the acid-proofness test and in wear strength after the alkali-proofness test. As for the durability against high-frequency electro-magnaetic waves after the wear strength test following the acid-proofness test and the durability against high-frequency electro-magnetic waves after the wear strength test following the alkali-proofness test, there was no spark generation, and no damages to the decorative members of the respective embodiments were noticed. In any of the embodiments, coloration properties were excellent since calcium, indium etc. were not contained as ingredients of the laminar elements.

TEST 1

Paste gold for overglaze decoration was prepared by the composition of Example 1 and applied, by the transfer paper method, around the rim of a table saucer 16 cm in diameter, in the form of a generally continuously patterned decoration of separate square-shaped laminar elements. The lengths of the diagonal lines of the squares (maximum lengths) were 1 mm, 2 mm, 3 mm, 4 mm, 5 mm, 6 mm, 7 mm and 8 mm with a line interconnecting the points of intersection of the diagonal lines of the respective squares describing a circle centered about the center of the saucer. The neighboring sides of the neighboring squares are parallel to one another with spacings of 0.125 mm. 0.2 mm, 0.5 mm and 0.8 mm.

TABLE 3

|  | Temperature | Dipping Time Duration | Name of Chemicals Used | Concentration of Chemicals | pH of Chemicals | Criteria for Judgement |
| --- | --- | --- | --- | --- | --- | --- |
| Acid-Proofness | Room Temperature | 24 hours | Acetic Acid | 4 wt % | 2.5 | 1 |
| Alkali-Proofness | 100° C. | 2 hours | Sodium Carbonate | 0.5 wt % | 11.0 | 2 |

The tests for wear strength after the acid-proofness test, durability against high-frequency electro-magnetic waves after the wear strength test following the acid-proofness test, wear strength after the alkali-proofness test and durability against high-frequency electro-magnetic waves after the wear strength test allowing the alkali-proofness test, are tests consisting in the combinations of the tests for wear strength, acid-proofness, alkali-proofness and durability against high-frequency electro-magnetic waves.

Coloration

The coloration property of the decorative members was measured using a color difference meter (OFC-31 manufac- The generally continuously patterned decoration of the laminar elements were fired at 800° C. to provide a decorative member presenting a gold color. The linear elements were each 0.2 μm in thickness. The decorative members, thus produced, were tested for durability against the high-frequency electromagnetic waves, using an electronic range, in the same way as in Example 1. The results are shown in Table 4.

TABLE 4

| Side Length mm | Diagonal Line Length mm | Distance between Neighboring Laminar Elements and Durability against High-Frequency Electro-Magnetic Waves | | | |
|---|---|---|---|---|---|
| | | 0.125 mm | 0.2 mm | 0.5 mm | 0.8 mm |
| 5.7 | 8 | NG | NG | NG | NG |
| 4.9 | 7 | NG | NG | NG | OK |
| 4.2 | 6 | NG | OK | OK | OK |
| 3.5 | 5 | NG | OK | OK | OK |
| 2.8 | 4 | NG | OK | OK | OK |
| 2.1 | 3 | NG | OK | OK | OK |
| 1.4 | 2 | NG | OK | OK | OK |
| 0.7 | 1 | NG | OK | OK | OK |

On some of the decorative members, produced as described above, the laminar elements were shorted, using 2 ml of water, and a test on durability against high-frequency electromagnetic waves similar to that of Example 1 was conducted using an electronic range. On the other hand, a scratch was formed from a point of intersection (i.e., center) of diagonal lines of the laminar elements normal to a side of the laminar element so as to have a length equal to one-half that of the side of the element (square) and a thickness equal to 0.2 μm, and the laminar element was tested for durability with respect to the same high-frequency electromagnetic wave as that of the Example 1, using an electronic range. The results are shown in Table 5.

TABLE 5

| | | Distance between Neighboring Plate-Shaped Elements and Durability | | | | | |
|---|---|---|---|---|---|---|---|
| | Diagonal | 0.2 mm | | 0.5 mm | | 0.8 mm | |
| Side Length mm | Line Length mm | In Case of Shorting with Water | In Case of Scratching | In Case of Shorting with Water | In Case of Scratching | In Case of Shorting with Water | In Case of Scratching |
| 4.2 | 6 | NG | NG | NG | NG | OK | NG |
| 3.5 | 5 | NG | NG | NG | NG | NG | OK |
| 2.8 | 4 | NG | OK | NG | OK | NG | OK |
| 2.1 | 3 | NG | OK | NG | OK | OK | OK |
| 1.4 | 2 | NG | OK | NG | OK | NG | OK |
| 0.7 | 1 | NG | OK | OK | OK | OK | OK |

It is seen from Table 4 that, if the laminar element is square-shaped, the spacing between neighboring laminar element is not less than 0.2 mm and the maximum length of the laminar element is not more than 6 mm, the decorative member is not damaged, provided that there is no shorting with water. On the other hand, it is also confirmed as shown in Table 5 that, if there is shorting with water or it a scratch has been formed on the laminar member, the decorative member is liable to be damaged:

TEST 2

Paste gold for overglaze decoration was prepared by the composition of Example 1 and applied around the rim of a table saucer 16 cm in diameter in the form of a generally continuously patterned decoration of separate circular laminar elements by the transfer paper method. The diameters of the circles (maximum lengths) were 1 mm, 2 mm, 3 mm, 4 mm, 5 mm, 6 mm, 7 mm, 8 mm, 8.5 mm, 9 mm and 10 mm, with lines interconnecting the centers of the respective circles describing a circle centered about the center of the saucer. The spacings of the neighboring circles were 0.125 mm, 0.2 mm, 0.5 mm and 0.8 mm. The generally continuously patterned decoration of the laminar elements were fired at 800° C. to provide a decorative member presenting a gold color. The laminar elements were each 0.2 μm in thickness. The decorative members, thus produced, were tested for durability against the high-frequency electromagnetic waves, using an electronic range, in the same way as in Example 1. The results are shown in Table 6.

TABLE 6

| Diameter | Distance between Neighboring Laminar Elements and Durability against High-Frequency Electro-Magnetic Waves | | | |
|---|---|---|---|---|
| mm | 0.125 mm | 0.2 mm | 0.5 mm | 0.8 mm |
| 10 | NG | NG | NG | NG |
| 9 | NG | NG | NG | OK |
| 8.5 | NG | OK | OK | OK |
| 8 | NG | OK | OK | OK |
| 7 | NG | OK | OK | OK |
| 6 | NG | OK | OK | OK |
| 5 | NG | OK | OK | OK |
| 4 | NG | OK | OK | OK |
| 3 | NG | OK | OK | OK |
| 2 | NG | OK | OK | OK |
| 1 | NG | OK | OK | OK |

It is seen from Table 6 that, if the laminar elements are circular in shape, the spacing between neighboring laminar elements is not less than 0.2 mm, and the maximum length of the laminar element is not more than 8.5 mm, the decorative member is not damaged failing shorting with water or scratches.

TEST 3

Paste gold for overglaze decoration was prepared by the composition of Example 1 and applied by the transfer paper method around the rim of a table saucer 16 cm in diameter in the form of a generally continuously patterned decoration of separate rope-shaped elements. The maximum lengths of the rope shapes were 3.3 mm, 4.4 mm, 5.5 mm., 6.3 mm, 7.3 mm, 8.5 mm, 9.1 mm and 10 mm, with a line interconnecting the center points of line segments representing the maximum lengths of the rope shapes describing a circle centered about the center of the saucer. The spacings between neighboring rope-shaped elements were 0.125 mm, 0.2 mm, 0.5 mm and 0.8 mm. The generally continuously patterned decoration of the laminar elements was fired at 800° C. to form a golden decorative member. The laminar elements were 0.2 μm in thickness. The decorative members, thus produced were put to the same test on durability without shorting with water with respect to the high-frequency electro-magnetic waves as that of Example 1 using an electronic range. The results are shown in Table 7.

TABLE 7

| Max. Length of Constitutuent Elements | Distance between Neighboring Laminar Elements and Durability against High-Frequency Electro-Magnetic Waves | | | | |
|---|---|---|---|---|---|
| mm | 0.125 mm | 0.2 mm | 0.35 mm | 0.5 mm | 0.8 mm |
| 10.0 | NG | NG | NG | NG | OK |
| 9.1 | NG | NG | NG | OK | OK |
| 8.5 | NG | OK | OK | OK | OK |
| 7.3 | NG | OK | OK | OK | OK |
| 6.3 | NG | OK | OK | OK | OK |
| 5.5 | NG | OK | OK | OK | OK |

TABLE 7-continued

| Max. Length of Constitutuent Elements | Distance between Neighboring Laminar Elements and Durability against High-Frequency Electro-Magnetic Waves | | | | |
|---|---|---|---|---|---|
| mm | 0.125 mm | 0.2 mm | 0.35 mm | 0.5 mm | 0.8 mm |
| 4.4 | NG | OK | OK | OK | OK |
| 3.3 | NG | OK | OK | OK | OK |

It is seen from Table 7 that, with the spacing between neighboring laminar elements of not less than 0.2 mm and with the maximum length of the laminar element being not more than 8.5 mm, no damage to the decorative member is produced failing shorting with water or scratches. On the other hand, if the spacing between neighboring laminar elements is 0.5 mm, no damage to the decorative member is produced falling shorting with water or scratches, even if the maximum length of the laminar element is 9.1 mm, while, if the spacing between neighboring laminar elements is 0.8 mm, no damage to the decorative member is produced failing shorting with water or scratches, even if the maximum length of the laminar element is 10 mm. Thus, by defining the spacing between neighboring laminar elements so as to be within a pe-set range, durability against high-frequency electromagnetic waves can be afforded failing shorting with water or scratches.

Example 9

The decorative members produced in test 1 were coated with a frit layer prepared by the composition and method of Example 1. The frit layer had a layer thickness of 10 μm after firing. The frit layer was coated substantially uniformly with 2 ml of water and put to the same test on durability against high-frequency electromagnetic waves as that of Example 1, using an electronic range. Also, a scratch having a thickness of 5 μm or 15 μm and a length equal to one half the length of a side of the laminar element was formed from the surface of the frit layer. The direction of the scratch is normal to a side of each laminar element from the point of intersection of diagonal lines thereof. The decorative members were put to the same test on durability against high-frequency electro-magnetic waves as that of Example 1, using an electronic range. The result3 are shown in Table 8.

TABLE 8

| | | Distance between Neighboring Laminar Elements and Durability against High-Frequency Electro-Magnetic Waves | | | | | | | | |
|---|---|---|---|---|---|---|---|---|---|---|
| | | 0.2 mm | | | 0.5 mm | | | 0.8 mm | | |
| Side Length mm | Diagonal Line Length mm | In Case of Being Coated with Water | In Case of Scratch Thickness of 5 μm | In Case of Scratch Thickness of 15 μm | In Case of Being Coated with Water | In Case of Scratch Thickness of 5 μm | In Case of Scratch Thickness of 15 μm | In Case of Being Coated with Water | In Case of Scratch Thickness 5 μm | In Case of Scratch Thickness of 15 μm |
| 4.2 | 6 | OK | OK | NG | OK | OK | NG | OK | OK | NG |
| 3.5 | 5 | OK | OK | NG | OK | OK | NG | OK | OK | NG |
| 2.8 | 4 | OK | OK | NG | OK | OK | NG | OK | OK | NG |
| 2.1 | 3 | OK | OK | NG | OK | OK | NG | OK | OK | NG |
| 1.4 | 2 | OK | OK | NG | OK | OK | NG | OK | OK | NG |
| 0.7 | 1 | OK | OK | NG | OK | OK | NG | OK | OK | NG |

It is seen from Table 8 that, in the cage where the laminar element is coated with a frit layer, if the laminar element is square-shaped, the spacing between neighboring laminar element is not lees than 0.2 mm and the maximum length of the laminar element is not more than 6 mm, no damage to the decorative member is caused even if water is present on the frit layer surface or a scratch not reaching the laminar element is present on the frit layer. On the other hand, if the scratch reaches the laminar element, it can be confirmed that damages are caused to the decorative member.

Examples 10 to 17 and Comparative Examples 1 to 4

Paste gold and paste silver for overglaze decoration having metal compositions as shown in Table 9 were prepared.

TABLE 9

| | | For Golden Decoration | | | | | | For Silvery Decoration | | | | | |
|---|---|---|---|---|---|---|---|---|---|---|---|---|---|
| | | *Ex. 10 | Ex. 11 | Ex. 12 | Ex. 13 | *Comp. Ex. 1 | Comp. Ex. 2 | Ex. 14 | Ex. 15 | Ex. 16 | Ex. 17 | Comp. Ex. 3 | Comp. Ex. 4 |
| Golden Components (parts by weight) | | 100 | 100 | 100 | 100 | 100 | 100 | 100 | 100 | 100 | 100 | 100 | 100 |
| Components | Au | 96 | 96 | 90 | 78 | 96 | 78 | 96 | 96 | 90 | 78 | 96 | 78 |
| | Bi | 3.0 | 3.0 | — | — | 3.0 | — | 3.0 | 3.0 | — | — | 3.0 | — |
| | Rh | 0.6 | 0.6 | — | — | 0.6 | — | 0.6 | 0.6 | — | — | 0.6 | — |
| | Cr | 0.4 | 0.4 | — | — | 0.4 | — | 0.4 | 0.4 | — | — | 0.4 | — |
| | Si | — | — | 4 | 9 | — | 9 | — | — | 4 | 9 | — | 9 |
| | In | — | — | 3 | 5 | — | 5 | — | — | 3 | 5 | — | 5 |
| | Ca | — | — | 3 | 8 | — | 8 | — | — | 3 | 8 | — | 8 |
| Silvery Components (parts by weight) | | | | | | | | 2.5 | 2.5 | 2.5 | 2.5 | 2.5 | 2.5 |
| Components | Pt | — | — | — | — | — | — | 1.25 | 1.25 | 1.25 | 1.25 | 1.25 | 1.25 |
| | Pd | — | — | — | — | — | — | 1.25 | 1.25 | 1.25 | 1.25 | 1.25 | 1.25 |
| Plate-Shaped Elements | Shape | Square Shaped | Square Shaped | Square Shaped | Square Shaped | **Line | **Line | Square Shaped | Square Shaped | Square Shaped | Square Shaped | **Line | **Line |
| | Size | 4 mm | 4 mm | 4 mm | 4 mm | Width 4 mm | Width 4 mm | 4 mm | 4 mm | 4 mm | 4 mm | Width 4 mm | Width 4 mm |
| | Distance between Neighboring Plate-Shaped Elements | 0.3 mm | 0.3 mm | 0.3 mm | 0.3 mm | 0 | 0 | 0.3 mm | 0.3 mm | 0.3 mm | 0.3 mm | 0 | 0 |
| Frit Component (parts by weight) | | 100 | 100 | 100 | 100 | 0 | 0 | 100 | 100 | 100 | 100 | 0 | 0 |
| Components | $Na_2O$ | 3.5 | 5.5 | 3.5 | 3.5 | | | 3.5 | 5.5 | 3.5 | 3.5 | | |
| | $K_2O$ | 5.0 | 8.0 | 5.0 | 5.0 | | | 5.0 | 8.0 | 5.0 | 5.0 | | |
| | CaO | 4.0 | 9.0 | 4.0 | 4.0 | | | 4.0 | 9.0 | 4.0 | 4.0 | | |
| | $Al_2O_3$ | 15 | 10 | 15 | 15 | | | 15 | 10 | 15 | 15 | | |
| | $B_2O_3$ | 12.5 | 14.5 | 12.5 | 12.5 | | | 12.5 | 14.5 | 12.5 | 12.5 | | |
| | $SiO_2$ | 60 | 53 | 60 | 60 | | | 60 | 53 | 60 | 60 | | |
| Durability against High-Frequency Electro-Magnetic Waves | | OK | OK | OK | OK | NG | OK | OK | OK | OK | OK | NG | OK |
| Wear Strength | | 100< | 100< | 100< | 100< | 100< | 100< | 100< | 100< | 100< | 100< | 100< | 100< |
| Chemical Durability | | OK | OK | OK | OK | OK | NG | OK | OK | OK | OK | OK | NG |
| Acid-Proofness | | 0 | 0 | 0 | 0 | 1 | 1 | 0 | 0 | 0 | 0 | 1 | 1 |
| Alkali-Proofness | | 0 | 0 | 0 | 0 | 1 | 4 | 0 | 0 | 0 | 0 | 1 | 4 |
| Wear Strength after Acid-Proofness Test | | 100< | 100< | 100< | 100< | 100< | 55 | 100< | 100< | 100< | 100< | 100< | 40 |
| Durability against High-Frequency Electro-Magnetic Waves after Wear Resistance Test following Acid-Proofness Test | | OK | OK | OK | OK | OK | OK | OK | OK | OK | OK | OK | OK |
| Wear Strength after Alkali-Proofness Test | | 100< | 100< | 100< | 100< | 100< | — | 100< | 100< | 100< | 100< | 100< | — |
| Durability against High-Frequency Electro-Magnetic Waves after Wear Resistance Test following Alkali-Proofness Test | | OK | OK | OK | OK | NG | — | OK | OK | OK | OK | NG | — |
| Coloration | | 1.8 | 1.0 | 1.5 | 1.4 | 1.8 | 1.3 | 1.7 | 0.9 | 1.3 | 1.4 | 1.8 | 1.2 |
| Electrical Nonconductivity after Grinding with Sand Paper (#4000) | | OK | OK | OK | OK | NG | NG | OK | OK | OK | OK | NG | NG |

*Ex. = Example
Comp. = Comparative Example
**Gold Rope 4 mm in Width

First, using terebene oil, a gold resin balsam sulfide solution containing 25 wt. % of gold (Au), a bismuth resin acid salt solution containing 6 wt % of bismuth (Bi), rhodium resin acid salt solution containing 5 wt % of rhodium (rh), a chromium resin acid salt solution containing 5 wt % of chromium (Cr), a vanadium resin acid salt solution containing 6 wt % of vanadium (V), a platinum remain acid salt solution containing 10 wt % of platinum (Pt), a palladium resin acid salt solution containing 10 wt % palladium (Pd), an indium resin acid salt solution containing 5 wt % of indium (In), a silicon resin acid salt solution containing 20 wt % of silicon (Si) and a calcium resin acid salt solution containing 5 wt % of calcium (C), were prepared. Paste gold for overglaze decoration, having the composition shown in each Example, was prepared from each of the above solutions. For example, in Example 10, the composition containing 38.4 parts by weight of the gold resin balsam sulfide solution, 5.0 parts by weight of the bismuth resin acid salt solution, 1.2 parts by weight of the rhodium resin acid salt solution, 0.4 part by weight or the chromium resin acid salt solution, 40 parts by weight of resin balsam and 15 parts by weight of terebene oil, was used for preparing the paste gold for overglaze decoration.

In Examples 10 to 17, the paste gold for overglaze decoration or paste silver for overglaze decoration, prepared as described above, was applied in a generally continuously patterned decoration of square-shaped laminar elements by the transfer paper method around the rim of a table saucer 16 cm in diameter. The square had a length of a diagonal line (maximum length) of 4 mm, with the neighboring sides of neighboring squares being parallel to each other and the spacing between the neighboring squares being 0.3 mm. The generally continuously patterned decoration of the laminar elements was fired at 800° C. to form decorative elements having a gold or silver color. The laminar elements at this time had a thickness of 0.15 $\mu$m. Then, 60 parts by weight of the frit ingredients, shown in Table 1, were formed into paste, using 10 parts by weight of the acrylic resin and 24 parts by weight of SOLVESSO (manufactured by ESSO STANDARD OIL INC.), and the laminar elements in their entirety were coated with the paste in accordance with the transfer paper method. The resulting assembly was fired by holding at 850° C. for 10 minutes to form a frit layer having a layer thickness of 10 $\mu$m. The decorative members, produced as described above, were then tested as to durability against high-frequency electromagnetic waves wear strength, chemical durability, acid-proofness alkali-proofness, wear strength after the acid-proofness test, durability against high-frequency electro-magnetic waves after the wear strength test following the acid-proofness test, wear strength after the alkali-proofness test, durability against high-frequency electro-magnetic waves after the wear strength test following the alkali-proofness test, coloration properties and electrical non-conductivity. The results are shown in Table 9. The test method and the evaluation standards for the electrical non-conductivity are as given below:

Electrical Non-Conductivity

The surface of each decorative element was ground with hand ten times using a sand paper (#4000) and subsequently the decorative member was checked as to electrical non-conductivity by a current tester. The electrically non-conductive decorative member and the electrically conductive decorative member were judged to be acceptable (OK) and rejectable (NG), respectively.

In the Comparative Examples 1 to 4, paste gold for overglaze decoration or paste silver for overglaze decoration, prepared as described above, was applied in a circular line 4 mm in width around the rim of a table saucer 16 cm in diameter by a circular (round) transfer paper method. The generally continuously patterned decoration of the laminar elements were fired at 800° C. for providing a decorative member presenting gold or silver color. The laminar element at this time was of a thickness of 0.2 $\mu$m. The decorative members, produced as described above, were then tested as to durability against high-frequency electromagnetic waves, wear strength, chemical durability, acid-proofness, alkali-proofness, wear strength after the acid-proofness test, durability against high-frequency elctro-magnetic waves after wear strength test following the acid-proofness test, wear strength after the alkali-proofness test, durability against high-frequency electro-magnetic waves after the wear strength following the alkali-proofness test, coloration properties and electrical non-conductivity. The results are shown in Table 9.

With the Comparative Examples 1 and 3, not having the frit layer, nor containing silicon for providing insulating properties, durability against high-frequency electro-magnetic waves radiated in an electronic range is inferior. With the Comparative Examples 2 and 4, in which a large quantity of silicon is contained for providing insulating properties, durability against high-frequency electro-magnetic waves radiated in an electronic range is excellent. However, if the decorating member is ground with a sand paper (#4000), it becomes electrically conductive, so that durability against high-frequency electro-magnetic waves radiated in an electronic range becomes inferior. With the Examples 12, 13, 16 and 17, having the coating of the frit layer, the decorative members are not electrically conductive even when ground with the sand paper (#4000), so that durability against high-frequency electro-magnetic waves radiated in an electronic range is excellent. However, the coloration properties are unsatisfactory because of the larger amount of silicon contained in the laminar element.

The electrically conductive laminar elements of Examples 11 and 15, having usual compositions, are superior in durability against high-frequency electro-magnetic waves radiated in an electronic range, however, the content of $SiO_2$ in the compositional of the frit layer is slightly smaller, such that the frit tends to be excessively fused to react with the laminar element. Thus, the laminar elements are slightly low in coloration. The Examples 10 and 14 are excellent in all aspects.

TEST 4

Paste gold for overglaze decoration was prepared by the composition of Example 1 and deposited by the transfer paper method around the rim of a table saucer 16 cm in diameter in the form of a generally continuously patterned decoration of separate square-shaped laminar elements. The lengths of the diagonal lines (maximum lengths) of the squares are 12 mm and 14 mm, with a line interconnecting the points of intersection of diagonal lines of the squares describing a circle centered about the center of the saucer. The neighboring sides of the neighboring squares are parallel to one another with spacings of 2 mm, 3 mm, 4 mm, 5 mm, 6 mm, 7 mm, 8 mm, 9 mm, 10 mm, 11 mm and 12 mm. The generally continuously patterned decoration of the laminar elements was fired at 800° C. to provide a decorative member presenting a gold color. The laminar elements were each 0.2 $\mu$m in thickness. The decorative members, thus produced, were tested for durability against high-frequency electromagnetic waves, using an electronic range, in the same way an in Example 1. On some of a number of decorative members, produced as described above, the laminar elements were shorted using 2 ml of water, and a test on durability against high-frequency electromagnetic waves similar to that of example 1 was conducted using an electronic range. The results are shown in Table 10.

TABLE 10

| | | Distance between Neighboring Laminar Elements and Durability against High-frequency Electro-Magnetic Waves | | | | | | | | | | | |
|---|---|---|---|---|---|---|---|---|---|---|---|---|---|
| Side Length | Diagonal Line Length | 2 mm Shorting with Water | | 3 mm Shorting with Water | | 4 mm Shorting with Water | | 5 mm Shorting with Water | | 6 mm Shorting with Water | | 7 mm Shorting with Water | |
| mm | mm | *No | *Yes | No | Yes | No | Yes | No | Yes | No | Yes | No | Yes |
| 8.5 | 12 | NG | NG | NG | NG | NG | NG | NG | NG | NG | NG | NG | NG |
| 9.9 | 14 | NG | NG | NG | NG | NG | NG | NG | NG | NG | NG | NG | NG |

| | | Distance between Neighboring Laminar Elements and Durability against High-frequency Electro-Magnetic Waves | | | | | | | | | |
|---|---|---|---|---|---|---|---|---|---|---|---|
| Side Length | Diagonal Line Length | 8 mm Shorting with Water | | 9 mm Shorting with Water | | 10 mm Shorting with Water | | 11 mm Shorting with Water | | 12 mm Shorting with Water | |
| mm | mm | No | Yes | No | Yes | No | Yes | No | Yes | No | Yes |
| 8.5 | 12 | NG | NG | NG | NG | OK | NG | OK | NG | OK | NG |
| 9.9 | 14 | NG | NG | NG | NG | NG | NG | NG | NG | NG | NG |

*In case shorting with water is found, it is marked "Yes".
*In case shorting with water is not found, it is marked "No".

It is seen from Table 10 that, if the laminar element is square-shaped, the spacing between neighboring laminar elements is not less than 10 mm and the maximum length of the laminar element is not more than 12 mm, the decorative member is not damaged if there is no shorting with water. However, it may be noticed that, if there is shorting with water, the decorative member is damaged.

Example 18

Each of the decorative members, produced by Test 4, was coated with a frit layer produced by the composition and the method of Example 1. The frit layer had a thickness of 10 μm. The decorative member was coated uniformly with 2 ml of water and tested for durability against high-frequency electromagnetic waves using on electronic range. The results are shown in Table 11.

It s seen from Table 11 that, if the square-shaped laminar element is coated with the frit layer, the spacing between neighboring laminar elements is not less than 10 mm and the maximum length of the laminar element is not more than 12 mm, the decorative member is not damaged.

Examples 21 to 26 and Comparative Examples 5 to 7

Paste gold and paste silver for overglaze decoration having metal compositions as shown in Table 12 were prepared.

TABLE 11

| Side Length | Diagonal Line Length | Distance between Neighboring Laminar Elements and Durability against High-Frequency Electro-Magnetic Waves | | | | | | | | | | |
|---|---|---|---|---|---|---|---|---|---|---|---|---|
| mm | mm | 2 mm | 3 mm | 4 mm | 5 mm | 6 mm | 7 mm | 8 mm | 9 mm | 10 mm | 11 mm | 12 mm |
| 8.5 | 12 | NG | NG | NG | NG | NG | NG | NG | NG | OK | OK | OK |

TABLE 12

| Example No. | | 21 | 22 | 23 | 24 | 25 | 26 | Comp. Ex. *5 | Comp. Ex. *6 | Comp. Ex. *7 |
|---|---|---|---|---|---|---|---|---|---|---|
| Golden Components (parts by weight) | | 100 | 100 | 100 | 100 | 100 | 100 | 100 | 100 | 100 |
| Components | Au | 96 | 96 | 90 | 96 | 96 | 90 | 96 | 96 | 96 |
| | Bi | 3 | 3 | | 3 | 3 | | 3 | 3 | 3 |
| | Rh | 0.6 | 0.6 | | 0.6 | 0.6 | | 0.6 | 0.6 | 0.6 |
| | Cr | 0.4 | 0.4 | | 0.4 | 0.4 | | 0.4 | 0.4 | 0.4 |
| | Si | | | 4 | | | 4 | | | |
| | In | | | 3 | | | 3 | | | |
| | Ca | | | 3 | | | 3 | | | |
| Silvery Components (parts by weight) | | 0 | 0 | 0 | 0 | 0 | 0 | 0 | 0 | 0 |
| Components | Pt | | | | | | | | | |
| | Pd | | | | | | | | | |
| Frit Components (parts by weight) | | 100 | 100 | 100 | 100 | 100 | 100 | 100 | 100 | 100 |
| Components | $Na_2O$ | 3.5 | 5.5 | 3.5 | 3 | 3 | 3 | 3.5 | 5.5 | 3.5 |
| | $K_2O$ | 5 | 8 | 5 | 3 | 3 | 3 | 5 | 8 | 5 |
| | CaO | 4 | 9 | 4 | 4 | 4 | 4 | 4 | 9 | 4 |
| | $Al_2O_3$ | 15 | 10 | 15 | 12.5 | 12.5 | 12.5 | 10 | 7 | 7 |
| | $B_2O_3$ | 12.5 | 14.5 | 12.5 | 12.5 | 12.5 | 12.5 | 12.5 | 18 | 13 |
| | $SiO_2$ | 60 | 53 | 60 | 57.5 | 57.5 | 57.5 | 50 | 48 | 65 |
| | $Li_2O$ | | | | 1.5 | | | | | |
| | MgO | | | | 2 | 2 | 2 | 6 | 2 | 2 |
| | $ZrO_2$ | | | | | | | | | |
| | $P_2O_5$ | | | | | | | | 0.5 | 0.5 |
| | PbO | | | | | | | | | |
| | BaO | | | | | 5.5 | 5.5 | 9 | 2 | |
| | SrO | | | | 4 | | | | | |

*Comp. Ex.: Comparative Example

First, using terebene oil, a gold resin balsam sulfide solution containing 25 wt. % of gold (Au), a bismuth resin acid salt solution containing 6 wt % of bismuth (Bi), rhodium resin acid salt solution containing 5 wt % of rhodium (Rh), a chromium resin acid salt solution containing 5 wt % of chromium (Cr), a platinum resin acid salt solution containing 10 wt % of platinum (Pt), a palladium resin acid salt solution containing 10 wt % of palladium (Pd), an indium resin acid salt solution containing 5 wt % of indium (In), a silicon resin acid salt solution containing 20 wt % of silicon (Si) and a calcium resin acid salt solution containing 5 wt % of calcium (C), were prepared. Paste gold for overglaze decoration, having the composition shown in each Example, was prepared from each of the above solutions.

In Examples 21 to 26, the paste gold for overglaze decoration or paste silver for overglaze decoration, prepared as described above, was applied in a generally continuously patterned decoration of square-shaped laminar elements by the transfer paper method around the rim of a table saucer 16 cm in diameter. The square had a length of a diagonal line (maximum length) of 4 mm, with the neighboring sides of neighboring squares being parallel to each other and the spacing between the neighboring squares being 0.3 mm. The generally continuously patterned decoration of the laminar elements was fired at 800° C. or 840° C. as shown in Table 13 to form decorative elements having a gold or silver color. The laminar elements had a thickness of 0.15 μm (after firing). Then, 60 parts by weight of the frit ingredients, shown in Table 12, were formed into paste, using 16 parts by weight of the acrylic resin and 24 parts by weight of SOLVESSO (manufactured by ESSO STANDARD OIL INC.), and the laminar elements in their entirety were coated with the paste in accordance with the transfer paper method. The resulting assembly was fired by holding at 850° C. for 10 minutes to form a frit layer having a layer thickness of 10 μm. The decorative members, produced as described above, were then tested as to durability against high-frequency electromagnetic waves (microwaves), wear strength, chemical durability, acid-proofness, alkali-proofness, wear strength after the acid-proofness test, durability against high-frequency electro-magnetic waves after the wear strength test following the acid-proofness test, wear strength after the alkali-proofness test, durability against high-frequency electro-magnetic waves after the wear strength test following the alkali-proofness test, coloration properties and electrical non-conductivity, in the same manner as in Example 1. The results are shown in Table 13. The test method and the evaluation standards for the electrical non-conductivity are as mentioned before.

Meanwhile, the durability against high-frequency electro-magnetic waves after the wear strength test following the acid-proofness test or the alkali-proofness test, and the non-conductivity after grinding with the sand paper (#4000) are problem-free on each example, although there are no indications in Tables 13 and 15 as contrasted to those shown in Table 9.

In the Comparative Examples 5 to 7, paste gold for overglaze decoration or paste silver for overglaze decoration, prepared as described above, was applied in a circular line 4 mm in width around the rim of a table saucer 16 cm in diameter by a circular transfer paper method. The generally continuously patterned decoration of the laminar elements were fired at 800° C. for providing a decorative member presenting gold or silver color. The laminar element at this time was of a thickness of 0.2 μm. The decorative members, produced as described above, were then tested as to durability against high-frequency electromagnetic waves, wear strength, chemical durability, acid-proofness, alkali-proofness, wear strength after the acid-proofness test, wear strength after the alkali-proofness test, and coloration properties in the same manner as in Example 1. The results are shown in Table 13. Further tests (a),(b) and (c) were carried out: (a) durability against high-frequency electro-magnetic waves after the wear strength test following the acid-proofness test, (b) durability against high-frequency electro-magnetic waves after the wear strength test following the alkali-proofness test, and (c) electrical non-conductivity. The results showed all "OX" including the Comparative Examples.

Examples 31 to 36 and Comparative Examples 8 to 10

Except that silver components are added as shown in Table 14 otherwise in the same conditions as Examples 21 to 26 and Comparative Examples 5 to 7 as shown in Tables 12 and 13, samples were prepared and tested likewise to obtain Examples 31 to 36 and Comparative Examples 8 to

TABLE 13

| Example No. | 21 | 22 | 23 | 24 | 25 | 26 | Comp. Ex. *5 | Comp. Ex. *6 | Comp. Ex. *7 |
|---|---|---|---|---|---|---|---|---|---|
| Yield Point | 649 | 610 | 649 | 653 | 673 | 668 | 623 | 612 | 662 |
| $\alpha \times 10^{-6}$ | 6.2 | 8.7 | 6.2 | 6.2 | 5.9 | 5.9 | 7.5 | 8.1 | 5.9 |
| One-Stage Firing Simultaneous Firing of Gold and Frit | 850° C. | 850° C. | 850° C. | 850° C. | 850° C. | 850° C. | 850° C. | 850° C. | 850° C. |
| Two-Stage Firing (1st Firing for Gold) | 800° C. | 800° C. | 840° C. | 800° C. | 800° C. | 840° C. | 800° C. | 800° C. | 800° C. |
| Two-Stage Firing (2nd Firing for Frit) | 850° C. | 850° C. | 850° C. | 850° C. | 850° C. | 850° C. | 850° C. | 850° C. | 850° C. |
| Glaze of Object for Decoration | Hard | Hard | Hard | Hard | Hard | Hard | Hard | Hard | Hard |
| Micro Wave Resistance | OK | OK | OK | OK | OK | OK | OK | OK | OK |
| Wear Strength | 100< | 100< | 100< | 100< | 100< | 100< | 100< | 100< | 100< |
| Chemical Resistance | OK | OK | OK | OK | OK | OK | x | x | OK |
| Acid Proofness | 0 | 0 | 0 | 0 | 0 | 0 | 1 | 1 | 0 |
| Alkali Proofness | 0 | 0 | 0 | 0 | 0 | 0 | 3 | 3 | 0 |
| Wear Strength after Acid-Proofness Test | 100< | 100< | 100< | 100< | 100< | 100< | 100< | 100< | 100< |
| Wear Strength after Alkali-Proofness Test | 100< | 100< | 100< | 100< | 100< | 100< | 100< | 100< | 100< |
| Coloration | 1.8 | 1 | 1.5 | 1.9 | 2 | 1.7 | 2.2 | 1.7 | 0.6 |

*Comp. Ex.: Comparative Example

TABLE 14

| Example No. | | 31 | 32 | 33 | 34 | 35 | 36 | Comp. Ex. *8 | Comp. Ex. *9 | Comp. Ex. *10 |
|---|---|---|---|---|---|---|---|---|---|---|
| Golden Components (parts by weight) | | 100 | 100 | 100 | 100 | 100 | 100 | 100 | 100 | 100 |
| Components | Au | 96 | 96 | 90 | 96 | 96 | 90 | 96 | 96 | 96 |
| | Bi | 3 | 3 | | 3 | 3 | | 3 | 3 | 3 |
| | Rh | 0.6 | 0.6 | | 0.6 | 0.6 | | 0.6 | 0.6 | 0.6 |
| | Cr | 0.4 | 0.4 | | 0.4 | 0.4 | | 0.4 | 0.4 | 0.4 |
| | Si | | | 4 | | | 4 | | | |
| | In | | | 3 | | | 3 | | | |
| | Ca | | | 3 | | | 3 | | | |
| Silvery Components (part by weight) | | 2.5 | 2.5 | 2.5 | 2.5 | 2.5 | 2.5 | 2.5 | 2.5 | 2.5 |
| Components | Pt | 1.25 | 1.25 | 1.25 | 1.25 | 1.25 | 1.25 | 1.25 | 1.25 | 1.25 |
| | Pd | 1.25 | 1.25 | 1.25 | 1.25 | 1.25 | 1.25 | 1.25 | 1.25 | 1.25 |
| Frit Components (parts by weight) | | 100 | 100 | 100 | 100 | 100 | 100 | 100 | 100 | 100 |
| Components | $Na_2O$ | 3.5 | 5.5 | 3.5 | 3 | 3 | 3 | 3.5 | 5.5 | 3.5 |
| | $K_2O$ | 5 | 8 | 5 | 3 | 3 | 3 | 5 | 8 | 5 |
| | CaO | 4 | 9 | 4 | 4 | 4 | 4 | 4 | 9 | 4 |
| | $Al_2O_3$ | 15 | 10 | 15 | 12.5 | 12.5 | 12.5 | 10 | 7 | 7 |
| | $B_2O_3$ | 12.5 | 14.5 | 12.5 | 12.5 | 12.5 | 12.5 | 12.5 | 18 | 13 |
| | $SiO_2$ | 60 | 53 | 60 | 57.5 | 57.5 | 57.5 | 50 | 48 | 65 |
| | $Li_2O$ | | | | 1.5 | | | | | |
| | MgO | | | | 2 | 2 | 2 | 6 | 2 | 2 |
| | $ZrO_2$ | | | | | | | | | |
| | $P_2O_5$ | | | | | | | | 0.5 | 0.5 |
| | PbO | | | | | | | | | |
| | BaO | | | | | 5.5 | 5.5 | 9 | 2 | |
| | SrO | | | | 4 | | | | | |

*Comp. Ex.: Comparative Example

10. The results are shown in Table 15 except for the tests (a)–(c). The results of the tests (a)–(c) showed all "OK" including Comparative Examples.

(BaO+SrO) is preferably 0.5% or more, more preferably 2–6%. If SrO exceeds 4.5%, the coloration tends to be inferior to the case with no SrO, while the chemical resis-

TABLE 15

| Example No. | 31 | 32 | 33 | 34 | 35 | 36 | Comp. Ex. *8 | Comp. Ex. *9 | Comp. Ex. *10 |
|---|---|---|---|---|---|---|---|---|---|
| Yield Point | 649 | 610 | 649 | 653 | 672 | 668 | 623 | 612 | 662 |
| $\alpha \times 10^{-6}$ | 6.2 | 8.7 | 6.2 | 6.2 | 5.9 | 5.9 | 7.5 | 8.1 | 5.9 |
| One Stage Firing Simultaneously Firing of Gold and Frit | 850° C. | 850° C. | 850° C. | 850° C. | 850° C. | 850° C. | 850° C. | 850° C. | 850° C. |
| Two-Stage Firing (1st Firing for Gold) | 800° C. | 800° C. | 840° C. | 800° C. | 800° C. | 840° C. | 800° C. | 800° C. | 800° C. |
| Two-Stage Firing (2nd Firing for Frit) | 850° C. | 850° C. | 850° C. | 850° C. | 850° C. | 850° C. | 850° C. | 850° C. | 850° C. |
| Glaze of Object for Decoration | Hard | Hard | Hard | Hard | Hard | Hard | Hard | Hard | Hard |
| Micro Wave Resistance | OK | OK | OK | OK | OK | OK | OK | OK | OK |
| Wear Strength | 100< | 100< | 100< | 100< | 100< | 100< | 100< | 100< | 100< |
| Chemical Resistance | OK | OK | OK | OK | OK | OK | x | x | OK |
| Acid-Proofness | 0 | 0 | 0 | 0 | 0 | 0 | 1 | 1 | 0 |
| Alkali-Proofness | 0 | 0 | 0 | 0 | 0 | 0 | 3 | 3 | 0 |
| Wear Strength after Acid-Proofness Test | 100< | 100< | 100< | 100< | 100< | 100< | 100< | 100< | 100< |
| Wear Strength after Alkali-Proofness Test | 100< | 100< | 100< | 100< | 100< | 100< | 100< | 100< | 100< |
| Coloration | 1.7 | 0.9 | 1.3 | 1.8 | 1.9 | 1.5 | 2.1 | 1.6 | 0.6 |

*Comp. Ex.: Comparative Example

As can be seen in Tables 12 to 15, further enhanced coloration values are achieved in the case where BaO and/or SrO is contained (Examples 24–26; 34–36). That is, compare Examples 24–26 with Examples 21–23, respectively. Also compare Examples 34–36 with Examples 31–33, respectively.

Comparative Examples 5 and 8 represent an excess amount of BaO resulting in a poor chemical resistance, whereas Comparative Examples 8 and 9 or 9 and 10 represent shortage in the amount of $SiO_2$ or $Al_2O_3$ in the frit resulting in a poor chemical resistance, respectively. Comparative Examples 7 and 10 represent an excess amount of $SiO_2$ being 65 wt %, resulting in a poor coloration value of 0.6. Thus the coloration value according to the present invention is contemplated to exceed 0.6, preferably 0.7, 0.8 or more.

The explanation has been done hereinabove with reference to the case with 2-stage sintering, the same results were developed by the one stage sintering as shown in Tables 12 and 13 as well as Tables 14 and 15.

The yield point and $\alpha$ (coefficient of linear expansion between room temperature and 600° C.) shown in Tables 13 and 15 relate to characteristics of the frits. The yield points of an order of approximately ranging 600 to 700° C. are preferred, more preferred is about 650° C. It may be about 550° C. or above in the case with soda glass etc. including lead.

As apparent from Tables 12 to 15, a further development is achieved for the frit composition. Namely, 0 to 4% MgO, 52 to 62% $SiO_2$, 0 to 4% $ZrO_2$, 8 to 18% $Al_2O_3$, 0 to 7% BaO and 0 to 4.5% SrO are allowed, provided that the ranges of $Na_2O$, $K_2O$, $Li_2O$, CaO, $B_2O_3$ and $P_2O_5$ remain unchanged and the sum of the three ingredients $Na_2O$, $k_2O$ and CaO remain unchanged, as is the case with the basic frit composition aforementioned.

The amount of BaO is preferably 0.5% or more, more preferably 3–6% ; and the amount of SrO is preferably 0.5% or more, more preferably 2–4%. The sum of BaO and/or SrO (BaO+SrO) is preferably 0.5% or more, more preferably 2–6%. If SrO exceeds 4.5%, the coloration tends to be inferior to the case with no SrO, while the chemical resistance tends to be lowered, if BaO exceeds 7%. The coloration is shown by relative ratios based on values (Lab) measured by a color difference meter as contrasted to a reference color (1.0). A coloration value of 0.9 or above is well acceptable, and values of 1.0 or more are more preferred as shown at Ex. Nos.32 and 21.

Per 100 parts by weight of this frit composition, PbO of not more than 20 parts by weight may be added as aforementioned on the basic frit composition.

Based on the modified frit compositions, superior resistance to wear (abrasion) and chemical agents are achieved and the coloration is controlled with ease.

Also, these modified frit compositions provide an increased stability against any change in the sintering conditions (particularly change in the coloration depending on the change in the firing atmosphere or furnace). For instance the coloration of a targeted, specific color according to specific proportions of Pt, Pd, Ag and the like will be slightly changed if a roller hearth kiln is used as compared to the case with an electric furnace. However, the inclusion of BaO and/or Sro provides an increased range of coloration, which enables an easier control for achieving a desired color tone.

The exemplified embodiments include about 10% of noble metals such as Au etc. in the paste. However, the amount of noble metals can be reduced by a great extent in order to achieve a predetermined color as long as a paste with a high coloration ability is used. Therefore, the increased coloration contributes to the reduction in the noble metals.

Meritorious Effect of the Invention

The surface-decorated utensil according to the present invention is decorated with a decorative member comprised of laminar elements the spacing etc. of which is prescribed to a pre-set range and a frit layer coating the laminar elements. Since the decorative member is constructed in this manner, it is not damaged on exposure to high-frequency electromagnetic wave emanated from the electronic range. Also, if the moisture becomes attached to the frit layer, or the frit layer becomes scratched, the decorative member is not damaged on exposure to the high-frequency electromagnetic wave radiated by the electronic range, if the scratch does not reach the laminar elements. Moreover, since the decorative member is constructed as described above, it is superior in chemical durability and wear resistance, such that it is insusceptible to damage on repeated prolonged use of an electronic range. In addition, since there is no necessity of rendering the laminar element electrically non-conductive, the surface-decorated utensil can have beautiful gold or silver color tone. That is, the conventional practice has been to render the decorative member itself electrically non-conductive for preventing damage due to use in the electronic range. However, in such case, the utensil is not fully satisfactory in chemical durability or coloration. By providing the decorative member comprised of the laminar elements the spacings etc. of which are prescribed to be in a pre-set range and the frit layer covering the laminar element, a surface decorated utensil may be produced which can hardly be damaged on use in an electronic range and which is superior in chemical durability and coloration. The surface decorated utensil may be produced by the method according to the present invention.

According to a further aspect of the present invention, a further improved coloration is achieved to allow an easy control of the coloration besides the presence of superior resistance to wear and chemicals by means of the inclusion of at least one of BaO and SrO in the frit. The frit composition per se permits wide adjustability.

It should be noted that modifications obvious in the art can be made without departing from the gist and scope of the present invention herein disclosed and claimed as appended.

What is claimed is:

1. A surface-decorated utensil comprising a ceramic ware and a plurality of decorative laminar elements of noble metal on the surface thereof, characterized in that said laminar elements are disposed: as an alternative,
   (a) at a spacing between neighboring laminar elements of not less than 0.2 mm, with a maximum length of each laminar element being not more than 8.5 mm, or, as another alternative,
   (b) at a spacing between neighboring laminar elements of not less than 10 mm, with a maximum length of each laminar element being not more than 12 mm, and
   that said laminar elements are coated with a frit layer.

2. The surface-decorated utensil as defined in claim 1 wherein said noble metal is a mixture of gold and a metal selected from the group consisting of platinum, palladium and silver, or said noble metal contains gold.

3. The surface-decorated utensil as defined in claim 1 wherein said laminar element has a thickness of 0.1 to 50 μm.

4. The surface-decorated utensil as defined in claim 1 or 2 wherein said frit layer has a layer thickness of 0.1 to 50 μm.

5. The surface-decorated utensil as defined in claim 1 wherein said frit layer has a composition of:

| | |
|---|---|
| $Na_2O$ | 0 to 9 wt % |
| $K_2O$ | 0 to 10.5 wt % |
| $Li_2O$ | 0 to 10.5 wt % |
| CaO | 0 to 9 wt % |
| MgO | 0 to 3 wt % |
| $B_2O_3$ | 8 to 20 wt % |
| $SiO_2$ | 53 to 62 wt % |
| $ZrO_2$ | 0 to 2 wt % |
| $P_2O_5$ | 0 to 3 wt % |
| $Al_2O$ | 10 to 18 wt % | wherein the sum of the amounts of the three ingredients $Na_2O$, $K_2O$ and CaO is not less than 6 wt % and the sum of the amounts of the entire ingredients is 100 wt %.

6. The surface-decorated utensil as defined in claim 5 wherein the frit layer composition further includes not more than 20 parts by weight of PbO to 100 parts by weight of frit ingredients defined in claim 5.

7. The surface-decorated utensil as defined in claim 1 wherein the frit layer has a withstand voltage of not less than 80 V.

8. The surface-decorated utensil as defined in claim 1 wherein said frit layer has a composition of:

| | |
|---|---|
| $Na_2O$ | 0 to 9 wt % |
| $K_2O$ | 0 to 10.5 wt % |
| $Li_2O$ | 0 to 10.5 wt % |
| CaO | 0 to 9 wt % |
| MgO | 0 to 4 wt % |
| $B_2O_3$ | 8 to 20 wt % |
| $SiO_2$ | 52 to 62 wt % |
| $ZrO_2$ | 0 to 4 wt % |
| $P_2O_5$ | 0 to 3 wt % |
| $Al_2O_3$ | 8 to 18 wt % |
| BaO | 0 to 7 wt % |
| SrO | 0 to 4.5 wt % | wherein the sum of the amounts of the three ingredients $Na_2O$, $K_2O$ and CaO is not less than 6 wt % and the sum of the amounts of the entire ingredients is 100 wt %.

9. The surface-decorated utensil as defined in claim 8 wherein BaO and/or SrO is present in total of at least 0.5 wt %.

10. The surface-decorated utensil as defined in claim 8 wherein the frit layer composition further includes not more than 20 parts by weight of PbO to 100 parts by weight of frit ingredients defined in claim 8.

11. The surface-decorated utensil as defined in claim 8 wherein the frit layer has a withstand voltage of not less than 80 V.

12. A method for producing a surface-decorated utensil comprising a ceramic ware and a plurality of decorative laminar elements of noble metal on the surface thereof, characterized by comprising:
   applying said laminar elements on the surface of said ceramic ware using noble metal for overglaze decoration, wherein, said laminar elements are applied (in a dimension after firing): as an alternative,
   (a) at a spacing between neighboring laminar elements of not less than 0.2 mm with a maximum length of each laminar element being not more than 8.5 mm or, as another alternative,
   (b) at a spacing between neighboring laminar elements of not less than 10 mm with a maximum length of each laminar element being not more than 12 mm, coating said laminar elements with a frit layer; firing the resulting assembly;
   coating said laminar elements with a frit layer; and firing the resulting product.

13. A method for producing a surface-decorated utensil comprising a ceramic ware and a plurality of decorative laminar elements of noble metal on the surface thereof, characterized by comprising:
   applying said laminar elements on the surface of said ceramic ware using noble metal for overglaze decoration, wherein, said laminar elements are applied (in a dimension after firing) : as an alternative, (a) at a spacing between neighboring laminar elements of not less than 0.2 mm with a maximum length of each laminar element being not more than 8.5 mm or, as another alternative, (b) at a spacing between neighboring laminar elements of not less than 10 mm with a maximum length of each laminar element being not more than 12 mm; coating said laminar elements with a frit layer; and firing the resulting product.

14. The method as defined in claims 12 or 13 wherein said noble metal is a mixture of gold and a metal selected from the group consisting of platinum, palladium and silver, or said noble metal contains gold.

15. The method as defined in claim 12 or 13 wherein said laminar element has a thickness of 0.1 to 50 μm after firing.

16. The method as defined in claim 12 or 13 wherein said frit layer has a layer thickness of 0.1 to 50 μm aftering firing.

17. The method as defined in claim 12 or 13 wherein said frit layer has a composition of:

| | |
|---|---|
| $Na_2O$ | 0 to 9 wt % |
| $K_2O$ | 0 to 10.5 wt % |
| $Li_2O$ | 0 to 10.5 wt % |
| CaO | 0 to 9 wt % |
| MgO | 0 to 3 wt % |
| $B_2O_3$ | 8 to 20 wt % |
| $SiO_2$ | 53 to 62 wt % |
| $ZrO_2$ | 0 to 2 wt % |
| $P_2O_5$ | 0 to 3 wt % |
| $Al_2O_3$ | 10 to 18 wt % | wherein the sum of the amounts of the three ingredients $Na_2O$, $K_2O$ and CaO is not less than 6 wt % and the sum of the amounts of the entire ingredients is 100 wt %.

18. The method as defined of claim 17 wherein the frit layer composition further includes not more than 20 parts by weight of PbO to 100 parts by weight of frit ingredients defined in claim 17.

19. The method as claimed in claim 12 or 13 wherein the resulting frit layer has a withstand voltage of not less than 80 V after firing.

20. The method as defined in claim 12 or 13 wherein said frit layer has a composition of:

| | |
|---|---|
| $Na_2O$ | 0 to 9 wt % |
| $K_2O$ | 0 to 10.5 wt % |
| $Li_2O$ | 0 to 10.5 wt % |
| CaO | 0 to 9 wt % |
| MgO | 0 to 4 wt % |
| $B_2O_3$ | 8 to 20 wt % |
| $SiO_2$ | 53 to 62 wt % |
| $ZrO_2$ | 0 to 4 wt % |
| $P_2O_5$ | 0 to 3 wt % |
| $Al_2O_3$ | 8 to 18 wt % |
| BaO | 0 to 7 wt % |
| SrO | 0 to 4.5 wt % | wherein the sum of the amounts of the three ingredients $Na_2O$, $K_2O$ and CaO is not less than 6 wt % and the sum of the amounts of the entire ingredients is 100 wt %.

21. The method as defined in claim 20 wherein BaO and/or SrO is present in total of at least 0.5 wt %.

22. The method as defined in claim 20 or 21 wherein the frit layer composition further includes not more than 20 parts by weight of PbO to 100 parts by weight of frit ingredients defined in claim 20.

23. The method as defined in claim 20 wherein the resulting frit layer has a withstand voltage of not less than 80 V after firing.

* * * * *